United States Patent Office 3,132,799
Patented May 12, 1964

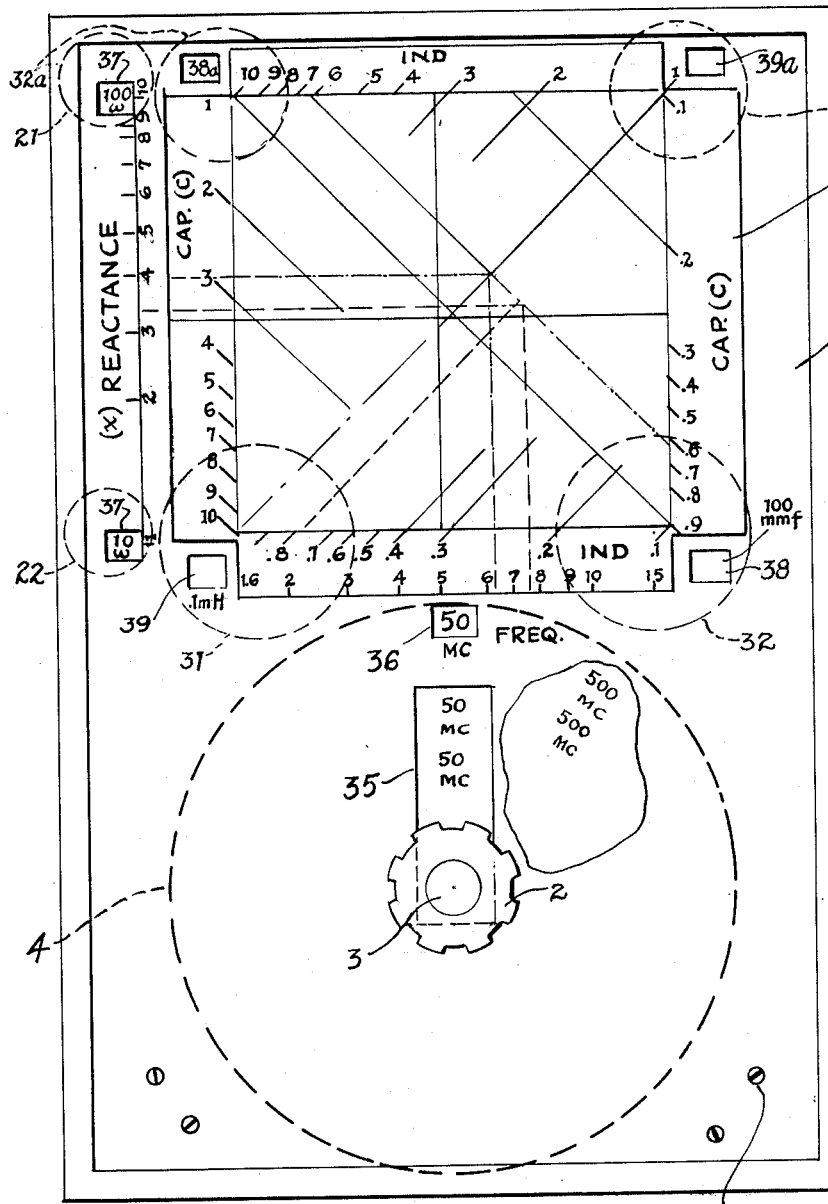
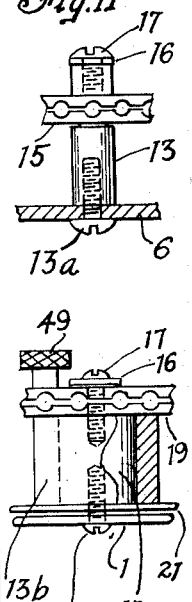
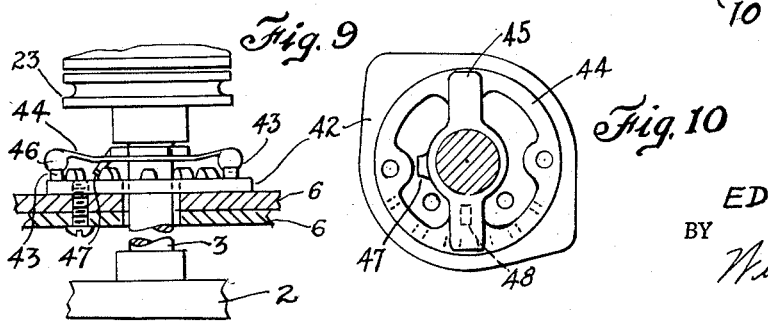
INVENTOR.
EDWARD M. SHIEPE
BY
William F. Nickel
ATTORNEY May 12, 1964 E. M. SHIEPE 3,132,799
COMPUTING APPARATUS
Filed Oct. 15, 1959 3 Sheets-Sheet 2
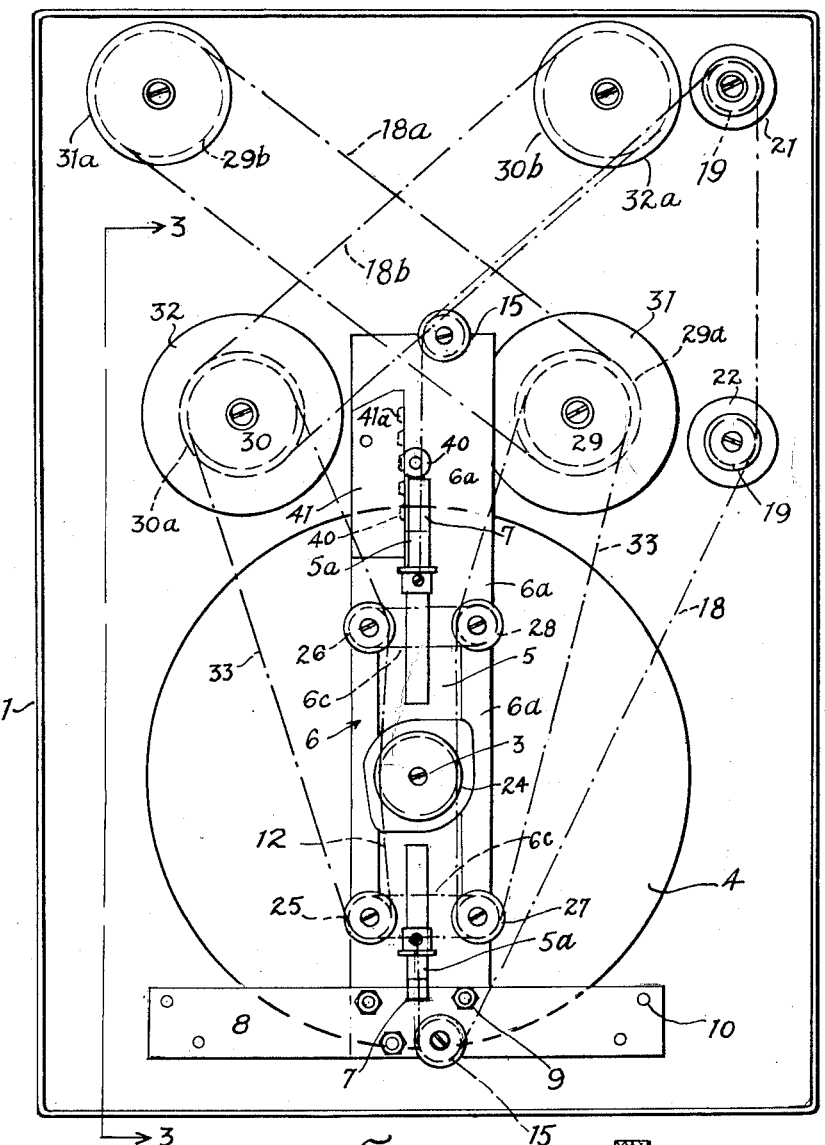
Fig. 2
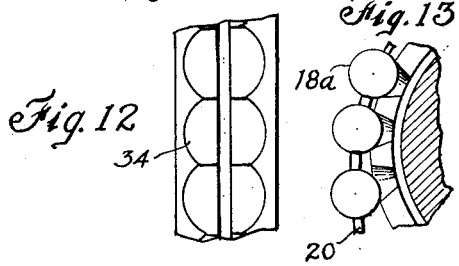
Fig. 12
Fig. 13
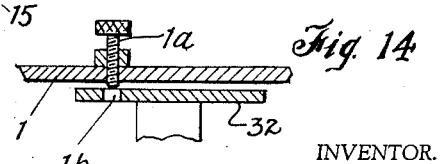
Fig. 14
INVENTOR.
EDWARD M. SHIEPE
BY
William F. Nickel
ATTORNEY

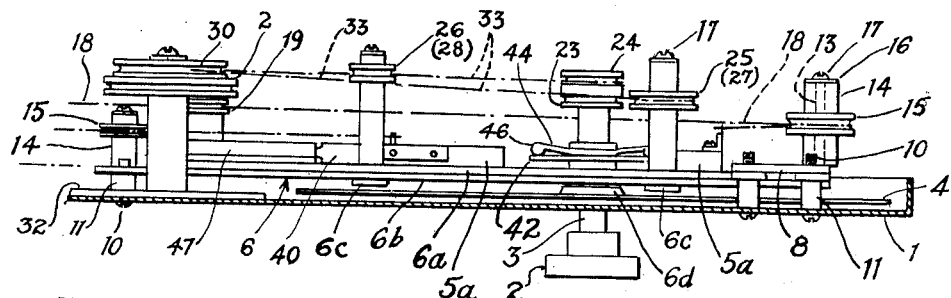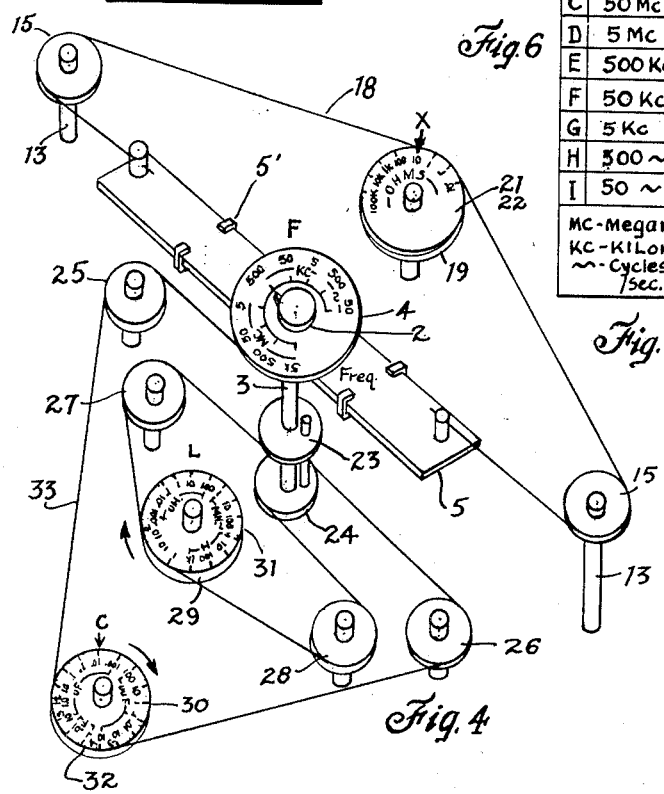

3,132,799
COMPUTING APPARATUS
Edward M. Shiepe, % Delta Radio Corporation,
115 Worth St., New York, N.Y.
Filed Oct. 15, 1959, Ser. No. 846,616
7 Claims. (Cl. 235—61)

My invention is an improvement on the "reactance" chart used for ascertaining the values of certain basic factors in alternating current electric circuits. It includes a chart having calibrated rows of indications of electrical measuring units and a device with adjustable parts bearing similar indications. The device and chart are especially useful in the design of electronic circuits; and are adapted, when some factors are already known, to facilitate the determination of other related factors.

The chart is on a panel carrying a mechanism for revealing the units for each of the scales on the chart in such a way that when any one is varied, all the others are automatically and correctly varied by the mechanism. Any factor may be held while the others are varied to suit. The operation of this device is very rapid and dependable.

The chart used here has parameters (abscissae, ordinates and sloping lines) marked off logarithmically, like a slide rule. This suits the problem in hand, but the mechanism can be used to identify and evaluate other types of charts.

An important object of this invention is to provide a computing device in the form of a mechanical unit comprising a panel bearing a number of movable parts to operate dials having calibrations, each of which indicates a scale value or measurement of a characteristic of an electronic circuit, and is to be utilized in calculations of other characteristics or factors and the values thereof, by the method according to which the device is to be manipulated. The characteristics on each dial are different from the characteristics on the other dials.

A further object of the invention is to provide a computing device comprising a panel bearing on its lower or rear face movable dials, each of which has a scale showing in calibrated form a series of factors or characters, and indicates different values thereof that are to be properly taken into consideration; and the panel is constructed with openings adjacent each of said scales, so that the factors or characters indicated on each scale can each be exposed to view in practice. When some of said factors are known, the dials are actuated to move such factors with respect to the panel. The device also bears on the panel the chart having a number of graphs leading to rows of calibrations of similar characters along the margins of the chart, so that the desired values can be established with the help of lines that can be traced to factors on the margin, to show the correct values of the remaining factors to be taken for the task in hand.

My most important object is to originate a method of calculating the values of certain factors in electronic circuits which enables results to be obtained quickly and with great assurance.

My chart is so laid out that the values in inductance are indicated along the top and bottom edges, the top values being in whole numbers and the bottom values in decimals; also in the same way, the two sides show values of capacitance; decimals on the right side and whole numbers (1 to 10) on the left side; and reactance is indicated along the left side of the chart, with frequencies on a horizontal scale below the decimal inductance scale.

A further object of my invention is to provide a mechanical unit as outlined above, which comprises parts that are capable of both rotational and shifting bodily movement with respect to the panel, and are so connected to the various dials that any measure or extent of either type of motion will rotate the dials through a proper degree or arc of circumferential movement.

The construction and the objects and advantages of the invention are all clearly set forth in the ensueing detailed description and the novel features are defined in the appended claims. The drawings illustrate the structure and mode of use of the device, but changes in details relating to the size, shape, arrangement and connection of the parts can of course be adopted without altering the essential characteristics of the invention.

On the drawings:

FIGURE 1 is a top plan of a computing device according to this invention.

FIGURE 2 is a bottom view of the same, showing the movable parts and the connections for actuating all the movable parts bearing the calibrated dials together, or a smaller number while holding several of the movable parts stationary.

FIGURE 3 is a side view of the movable parts of the apparatus seen from the right side of the device as it appears on FIGURE 2, the panel being in section along line 3—3 in FIGURE 2.

FIGURE 4 is a perspective diagrammatic view showing the manner in which the parts are connected.

FIGURE 5 shows a table of calibrated factors for reactance expressed in ohms.

FIGURE 6 shows a similar table of frequencies expressed in megacycles.

FIGURE 7 presents another such scale dealing with henries and millihenries.

FIGURE 8 is a scale of capacitance in farads and lesser quantities.

FIGURE 9 is a section of a detail showing a part of the device.

FIGURE 10 is a horizontal section on line 10 in FIGURE 9.

FIGURE 11 is a detail partly in section illustrating means for mounting an operating part of the device.

FIGURE 11a is a similar view of a mounting for another part thereof.

FIGURE 12 is a detail illustrating how the rotatable parts of the device are shaped to be joined to move together.

FIGURE 13 shows a portion of a flexible chain for such joining.

FIGURE 14 shows an attachment showing how the rotatable parts can be held in stationary positions.

In the operation of this device involving four variable factors, any single step taken (either sliding or turning) requires one of the four factors to remain fixed. When a knob is turned, changing three of the factors results, and not the factor involving sliding alone. When one slides a member connected to the knob without turning the knob, all factors again vary except the one involving knob-turning alone. Again, if said parts both slide and turn through one step, one of the other two factors will change twice as much while the other stays stationary. This latter is exactly like restraining mechanically the unvarying factor. Finally, suppose said slide is moved two while the knob is turned five steps or degrees simultaneously. This is exactly as if five separate steps were made, in each of which one factor was held fixed although the ultimate result shows all four factors different from their initial values.

The usual procedure in using the device would be to choose one of the two known factors and locate it on its scale, and then proceed further.

With one of the factors fixed or held in position one may proceed to locate the second by any sliding or turning motion which is possible. When this is done, the other two unknowns can be read at once.

An alternate way of constructing this device is to furnish knobs on the shafts of various dials which reveal values of the various factors so that any two such dials may be adjusted to suitable values. When the first is adjusted to a suitable value and locked in this position, alteration of any other dial to expose its suitable value automatically adjusts the remaining dials to expose their correct values. Care must be exercised in designing such a device that only one lock may operate at a time, for if two of them are locked, no adjustments can be made.

The device or instrument of this invention comprises a flat plate or panel 1 of any suitable outline, and on the upper face of the panel is a rotatable knob 2, fixedly mounted on a rotatable shaft 3, that extends through the panel and carries a dial 4, rigid therewith, close to the under face of said support or panel 1. The dial 4 is relatively large, and this dial and shaft are mounted on a sliding plate or member 5; and the shaft 3 projects through both the panel 1 and said member 5. A suitable retaining plate 6 for the member 5 fixed to the under face of the panel 1 has a longitudinal slot 7 in the middle; the side edges of plate 6 overlapping the member 5. The shaft 3, dial 4 and the member 5 can be moved lengthwise of the slot 7 by means of the knob 2. The plate 6 extends lengthwise of the panel from above the middle of the panel 1 towards the lower edge thereof, and the end of the plate 6 adjacent said lower edge is crossed by a flat metal strip 8, affixed to the plate 6 by screws and nuts 9. The plate 6 and the strip 8 are secured to the panel by screws 10, passing through the outer face of the panel and surrounded by short spacing sleeves or studs 11 between the panel, the plate 6 and strip 8. The screws 10 pass through the panel and enter suitable tapped holes in plate 6 and strip 8. The dial 4 is between the member 5 and plate assembly 6, and the panel 1, and the shaft 3 passes below the plate 6. The slot 7 is widened over the greater part of its length between the ends, as shown at 12.

The plate 6 can be composed of two layers 6a and 6b, with the member 5 in the same plane as the upper layer 6b, which is closer to the panel 1. The layer 6a will be shaped so that it has a longitudinal slot or recess in the middle for the sliding or translational movement of the shaft 3 as the member 5 is reciprocated along the panel; while the long edges of the lower plate 6a along the slot 7 project over the edges along the lower face of the member 5. The plate 6b has affixed thereto on the face presented to the panel 1 a pair of cross strips 6c which extend over the member 5, and hold it slidably upon the layer 6a over the slot 7. Any other suitable construction for slidably disposing the member 5 under the panel can be adopted, and bushings or washers 6d can be mounted on the shaft 3 between the dial 4 and member 5 for holding them firmly together.

The under face of the panel 1 also carries a pair of downward extending journals 13, one fixed to the strip 8 and the other to the opposite end of the plate 6; and on each of these journals is a rotatable hub or sleeve 14 with gear 15. See FIGURE 3 at the right. The gear 15 is kept in position by washers 16, held by headed screws 17 engaging the lower ends of said journals. Screws 13a or any other type of fastening means (FIGURE 11) can be used to affix these journals at their upper ends to the plate 6 and strip 8. A chain 18 is connected at its ends to projections 5a on the opposite extremities of the member 5 below the plate 6, said projections 5a being elongated and engaging the narrow end-portions of the slot 7. The chain 18 passes over the gears 15 to other gears 19 having tubular hubs 13b to which they are fixed, the hubs being mounted on bosses 13c (FIG. 11), secured to the panel 1 as before by screws 13a. One of the hubs of the gears 19 carries on its upper end directly under the panel a dial 21 bearing a number of calibrations to be described later; and the other carries a calibrated dial 22. The dials 21 and 22 and gears 19 are in alinement along one side near the top edge of the panel 1 and under it, near the middle and at the end of the panel remote from the plate 8, when the member 5 is moved, both the dials 21 and 22 turn together and both in the same direction. Gears 19 for the dials 21 and 22 preferably have the same diameter.

Below the sliding member 5 and plate 6, the shaft element 3 carries a pair of gears 23 and 24 rigid with each other and the shaft 3 (see FIGURES 3 and 4), so that when the knob 2 and dial 4 are turned the gears 23 and 24 will rotate in unison. In the plane of the lower gear 24 are idle gears 26 and 28, and in the plane of the upper gear 23 are idler gears 25 and 27. See FIGURE 3. All of these gears 25, 26, 27 and 28 are mounted as in FIG. 11. The gears 25 and 26 are to one side of the plate 6 and each is at one end of the widened part 12 of the slot 7 therein. On the opposite side of the plate 6 are gears 27 and 28, one at each end of the same space 12 and across the plate 6 directly in line with gears 25 and 26 respectively, the gear 27 being in the plane of the upper gear 23 and the gear 28 in the plane of the lower gear 24. The cross pieces 6c span the plate 6 over the journals for the gears 25, 26, 27 and 28, and are secured by the screws (not shown) that hold the journals for these four gears, or by other fastening means. The journals for the gears 25, 26, 27, and 28 are of course fixed to the plate 6.

Also on the lower face of the panel adjacent the inner end of the plate 6 (FIGURE 2) are two additional gears 29 and 30, with rigid hubs that may be rotatably mounted on bosses or projections, fixed to the panel 1 as in FIGURE 11a. The hubs of these gears 29 and 30 carry fixed on the ends adjacent the under face of the panel, disks 31 and 32 respectively, close to the panel, each disk or dial having calibrations on its face presented to the panel 1. FIGURE 2, being a bottom plan of the device, shows the locations of the dials and gears above-mentioned. The gears 29 and 30 and the studs therefor are separated from the plate 6.

The gear wheels 23 and 24, 29 and 30, and idle gears 25, 26, 27 and 28 are connected by an endless chain 33 running from, say the upper gear 23 on the shaft 3 to the gear 25 thence to the gear 30 and around it to the gear 26, which it engages at a few points only, and then around the lower gear 24 to the gear 28, thence over the gear 29 to the gear 27 and back to the upper gear 23. This chain 33 and the chain 18 are both made up of flexibly connected spherical elements 18a strung fast on a wire 20, and fit into separate rounded recesses 34 in grooves in the rims of all the gears; so that the various gears all move in unison through pre-determined arcs when the movable parts on the panel are manipulated. See FIGURES 12 and 13. Other means for connecting the various gears together to move as described can be adopted.

The diagrammatic view, FIGURE 4, illustrates in plan particularly how the various gears are situated and connected. FIGURE 4 shows also the member 5 slidably mounted in diagrammatically illustrated brackets 5', supported in any convenient manner, and for the sake of convenience the panel 1 is omitted. Only one gear 19 with its dial is shown. In FIGURE 4 the dials 21 and 22 do not appear in full, but are indicated as superposed. This mode of illustration is simply to save space. The dials 21 and 22 are really spaced part, as in FIGURES 1 and 3.

The panel has a longitudinal slot 35 through which the end of the shaft 3 carrying the knob 2 protrudes. Thus the member 5 can be shifted lengthwise under the panel, and in so moving, it will shift the dial 4 without rotation and will turn all othe other dials 21 and 22, 31 and 32; because if the slide 5 is moved towards the lower edge of the panel, for example, it will pull on part of the chain 18 leading to the gear 19 and dial 21 and lengthen this portion, while the rest of the chain 18 rotates the other gear 19 of the dial 22. Likewise, the gears 29 and 30 will then revolve, and in opposite directions, (FIG. 2) but the same direction (FIG. 4). When, however, the knob 2 is turned in any position of the sliding member 5, when this member is stationary, the chain 18 does not move and the gears for the dials 21 and 22 remain stationary, and the dial 32 will move in one direction while the dial 31 will move in the same direction, (FIG. 2) and not in opposite directions as shown on FIGURE 4. Of course, the large dial 4 now rotates also.

The upper face of the panel bears a chart C so arranged that the middle of this chart lies adjacent the upper end of the slot 35 in the panel, which also has an aperture 36 between this chart and the slot 35. Alongside upper and lower limits of the chart on the left are apertures 37 in the panel 1 and similar apertures 38 and 39 are at the right and left ends of the lower edge. The apertures 37 overlie respectively the dials 21 and 22, so that when these dials are turned, a single calibration on the face of each dial will appear adjacent each aperture 37. The apertures 38 and 39 expose characters on the dials 32 and 31 respectively, and the aperture 36 is adjacent the middle of the lower edge of the chart in line with the slot 35 and will expose a character on the dial 4. Of course the shaft 3 and slide member 5 are in the longitudinal center line of the panel 1.

Adjacent the gear 29 for the dial 31 and rigid with the same hub on said gear is a second gear 29a, which is connected by a chain loop 18a to a gear 29b on a hub mounted like the other hubs, as in FIG. 11a. The hub of this gear 29b also bears a rigid dial 31a adjacent the under face of the panel, and this dial 31a bears certain calibrations of inductance as the dial 31. As this dial 31a is rotated, turning with the dial 31 and always in the same direction, the calibrations on the dial 31a are exposed in succession through an aperture 39a in the panel 1 at the upper right corner of the chart C.

Also the hub of the gear 30 for the dial 32 carries another rigid gear 30a connected by a chain loop 18b to a gear 30b having a hub rotatably mounted on a similar boss 13c fixed to the lower face of the panel 1, also as in FIG. 11a. Rigid with the gear 30b is a dial 32a having the same calibrations of capacitance thereon as the dial 32, to be exposed at an opening 38a in the panel at the upper left corner of the chart C.

One can see by inspection of FIGURE 2 that, with the dial 4 not rotating, the knob 2 and slide member 5 can be moved up and down on the panel 1. When the knob and member 5 are thus moved up or down, all the other dials are rotated; when dial 4 is turned, with the slide member stationary, the gears 29 and 30 and their dials 31 and 32, together with dials 31a and 32a, revolve; dials 21 and 22 remaining motionless. But, either of the dials 31 and 32, with dials 31a and 32a respectively, can be held stationary by hand, while the dial 4 is rotated; and can also be held stationary when the knob 2 is moved along the slot 35 without trying to impart to dial 4 any rotation. When either dial 31, 32, 31a, 32a is prevented from rotating, the chain, as the case may be, merely slips by somewhat on that side and acts like a rack against which the gears roll. In order to facilitate holding each of these dials against rotation, the panel 1 is provided with stops of suitable construction; for example, a screw 1a mounted on the upper face of the panel above each dial to be arrested, and passing through the panel to engage the dials when the screws are turned down and hold them against movement. Each screw 1a will enter one of a row of holes 1b on the dials to keep it motionless with a desired indication exposed at an opening. See FIGURE 14. Other forms of stops can be adopted.

On all the dials except the dial 4, the values are arranged in a single curve line around the rim, but the dial 4 presents rows or columns of values, each of which extends in a radial line from the center. The values in each row or column are the same, but different from those in the other rows, so that the rows can be changed to register with the slot 35 and aperture 36, and the value of a factor of frequency in any row can be made to appear at the aperture 36 merely by moving the knob 2 along the slot 35. The frequencies in each column on the dial 4 are the same, but different in the several columns; and once a column on the dial 4 is in registry with the slot 35, the frequency indicated will always appear at the aperture 36 as the member 5 is moved along the panel 1.

The slide member 5 is provided with a spring strip 40 attached to a projection 5a on the slide 5 at one side thereof, and having a projection or roller 40a at its outer end to seat in recesses 41a of another strip 41 carried by the plate 6. This spring serves as a latch to hold the member 5 in each of its adjusted positions. The member 5 also carries a fixed disk 42 (FIGURES 9 and 10) centered on the shaft 3. This disk has a number of projections 43 spaced equi-distantly around the rim of said disk, and fixed to the shaft is a flexible circular ring 44 connected by arms 45 to the shaft. This ring carries on its under face one or more projections 46 which slide over the projections 43 on the fixed disk, and seat in the spaces between these projections when the knob is turned to rotate the dial 4. This dial is thus held at any of many equally spaced rotary positions. The ring has a stop 47 projecting downward to engage a stop 48 on the disk 42. Thus the rotation of the knob 2 and dial 4 is limited within one turn.

The gears 19 for the dials 21 and 22 may be equal in diameter, and so also respectively the gears 23 and 24; 29 and 30. Gears 29a and 29b, 30a and 30b may also be of the same size. Gears 23 and 24 must be equal in diameter and number of "teeth," if they are pinned together. It is preferable that they be so pinned, for then they may both be made to "drive" the endless chain 33 and thus make a better mechanical arrangement. A unit angular rotation of shaft 3, corresponding to the spaces between calibrations in the circular row on the member 5 (dial 4), causes the chain 33 to move a unit distance, which corresponds exactly to the motions of dials 29 and 30, to turn these dials from one calibration point to another. This unit distance of motion of chain 33 must also equal that of chain 18 and is the space between the different "reactance" positions. The gears 23 and 24 are equal.

The gears or pulleys 25 and 26 are so located that (in the rear or bottom view, FIG. 2) the straight line joining their pitch diameters (on the center-line of the chain) passes through the pitch diameter trace of gears 23 and 24. The purpose of this is to maintain a constant length of chain wherever slide member 5 may happen to be. Likewise with pulleys 27 and 28.

The gears for the various dials are all at the proper distances from the panel, so that the chains will clear one another at all points and can move freely to turn the various gears when the knob 2 is actuated to shift the member 5, and to turn the shaft or spindle 3 and dial 4. Also the size of the different dials can be chosen so that they have any convenient diameter and will not interfere with one another. For example the dials or disks 31 and 32 are held close to the panel, while the large disk 4 is spaced a small distance from the panel (see FIGURE 3) and, when pushed toward the chart, may overlap the dials 31 and 32, but will not obstruct the apertures 38 and 39. Further the dials 31a and 32a can be properly located and have any convenient diameter. The dial 32a can be easily mounted so that it may overlap the adjacent dial 21, without obstructing the adjacent opening 38a.

The chart C has calibrations relating to henries ranging from 1 to 10 right to left along the top, and from .1 to 1 right to left along the bottom. There are diagonals to be followed for these values, all running to the top and bottom of chart C. All such diagonal lines on the half of the chart above a line joining the upper right and lower left corner, and parallel to such line, are extended at a slant beyond the upper edge of the chart, and other such diagonals parallel to the same line below it between the same corners are extended at a slant beyond the lower edge of said chart.

Values of reactance in ohms are listed vertically from 1 to 10 on the scale to be read upward, at the left of the chart; and parallel horizontal lines across the chart are used in conjunction with this additional scale at the left. Further, along the bottom of the chart, under the lower inductance scale, is a scale of frequency running from 1.6 to 16 for parallel vertical lines on the chart. To evaluate the frequency scale conveniently, the near-center values are given in the aperture 36 near the "5" calibration line as multiples of 5 with proper units for each case.

Values of capacitance are listed along the vertical sides of the chart. On the right side are given the decimals reading downward from .1 to 1, and at the left the capacitance is read downward from 1 to 10. The capacitance diagonals intersect all of the diagonals for inductances. The diagonals below and parallel to a line joining the lower right and upper left corner are extended at a slant beyond the left side of the chart, and the diagonals above and parallel to the same line joining the same corners are extended beyond the right edge of the chart. All over the chart the vertical, horizontal and diagonal lines intersect one another as in any reactance chart.

In FIGURES 5, 6, 7 and 8:

L indicates inductance in henries
MH indicates millihenries
C indicates capacity in farads
Freq indicates frequency at "5" calibrations
∼ indicates cycles, KC=kilocycles, MC=megacycles
X indicates reactance in ohms
k indicates $10^3$-kilo.
μ indicates $10^{-6}$-micro.

FIGURES 5, 6, 7 and 8 tabulate the values or sizes of the various factors on the various dials above described. FIGURE 5 shows one set of values for the reactances, which can be arranged in full on the rim of each of the dials 21 and 22 in the order indicated on FIGURE 4, with each calibration in such location that one factor (10 for example) indicated on FIGURE 5, for example, will appear at the lower opening 37; and another factor e (100 ohms) of reactance is exposed at the upper opening 37. These evaluate the bottom and top extremities of the reactance scale. The size of the various inductances will be marked on the dial 31, in the same order as in FIGURE 7; and the size of the capacitance factors will be shown on the dial 32 in the same order as indicated in FIGURE 8; and the inductances and capacitances will appear one at a time at the openings 39 and 38 respectively. FIGURE 6 has the value of the frequencies, which are placed in radial columns on the dial 4, each column bearing eight equal values to appear at opening 36 in the panel 1, with each of the columns showing a set of values different from all the rest. See FIG. 1. The dial 31a, if incorporated into the instrument, would be made to read the same inductance value as 31, and dial 32a would read the same capacitance value as 32. The purpose of repeating these being to facilitate reading of the upper inductance and left capacitance scales.

In determining the characteristics of any electronic circuit, suppose that two factors are known at the outset. For example, at what frequency would a coil of .1 mH have 40 ohms reactance? What capacitance would tune it to this frequency?

First the apparatus is adjusted by hand to expose 100 ohms on the top dial 21 at the upper opening 37, and 10 ohms on the dial 22 at the lower opening 37. The number 100 is selected because it is the next number higher than 40, which is given, and the number 10 is chosen because it is the nearest lower number, on the calibrated scales used. See FIGURES 4 and 5. This is done by moving the slide 5 to actuate the chain 18, the shaft 3 now being held against rotation. Next the member 5 is held motionless, and the shaft 3 is now rotated; this turns dials 31 and 32 through the continuous chain 33, to bring the number .1 mH at the window 39. This also exposes the numbers mmf. in aperture 38 and 50 MC in aperture 36.

From the calibration marked on the reactance scale at the left, follow the corresponding horizontal line of the graph to the point of intersection with the diagonal running from the window 39 showing the factor .1 mH. From this point is taken the nearest diagonal leading down and towards the right. The capacitance scale at the right is chosen because all the diagonals along this scale are projected at their ends towards the calibrations thereof. Following this nearest diagonal towards the window 38 locates the end of said diagonal at .62.

As the window 38 shows 100 mmf., the capacitance required is .62 of this value or 62 mmf. See the dot and dash lines on FIGURE 1. From the same point of intersection of the horizontal line at 4 and the diagonal leading to .62 on the scale at the right, an ordinate is now traced to the frequency scale at the bottom of the chart. This ordinate ends at a point marked at 6.4 and this figure indicates 64 MC as the value of the frequency required by the circuit; and thus factors of resonance are obtained.

As another example, suppose 62 mmf. capacitance and 750 KC are known. The reactance of the coil or condenser at resonance in the circuit is found by tracing the diagonal from the point .62 on the scale at the right of the chart to the vertical ordinate at the point 75 on the frequency scale below the chart. The diagonal at the intersection of these two lines leading downward to the left must be followed because its lower end is prolonged at the lower inductance scale and this diagonal gives .78 mH as the required inductance. Also the horizontal abscissa from the same point towards the reactance scale indicates 34, and the reactance is 3400 ohms. See the dash lines on FIGURE 1.

Of course, the chart is covered over its entire extent with horizontal abscissa, vertical ordinates and diagonal lines all intersecting one another; indictaing the values on the scales and values between the numbers listed, but only a few of such lines are included in FIGURE 1 for the sake of clearness. All the values on the chart are of course carefully worked out, and the values and the order of the four factors on the scales are calculated and arranged accordingly.

The various gears and dials can have knobs so that they can be moved independently, if such movement is desirable. Such a knob is indicated at 49 in FIGURE 11a and these knobs can be easily reached under the panel, if they are needed. By means of the knobs 49 the proper adjustments can always be made to expose the factors desired at the outset at the respective openings in the panel 1. Also the various gears and dials could be so mounted on the panel that the shafts which rotate the gears and dials can project through the panel, and such knobs may then be located on the upper face thereof.

Having described my invention, what I believe to be new is:

1. The combination of a chart, a support therefor, a member attached to the support and disposed to be shifted towards and from one end of the support, a rotatable shaft on said member, a dial affixed to said shaft, additional dials rotatably carried by said support, a chain having its ends secured to said member and operatively connected to rotate said additional dials when the support is shifted, other additional dials on the support, chains, operatively connecting said other additional dials to said shaft, said chart having vertical and horizontal intersecting lines and diagonal lines intersecting one another and the aforesaid lines, the chart also having rows of calibrated indications of electrical measuring units adjacent its edges, the indications of each row being different from the indications of the other rows, each line having each of its opposite edges adjacent one of said indications, each dial having a single row of indications similar to a row of indications on the chart, the indications on the various dials matching all said indications on said chart.

2. The combination of a panel, a chart thereon, a slidable member carried by the panel adjacent one end thereof, a rotatable shaft on said member, a dial affixed to said shaft, additional dials rotatably supported by said panel adjacent said chart, a chain having its ends fixed to the support and connected to operate two of said dials, additional chains connecting the remaining additional dials to said shaft, said chart having intersecting vertical and horizontal lines and diagonal lines intersecting one another and the lines aforesaid, the chart also having rows of calibrated indications of electrical measuring units adjacent its edges, the indications of each row being different from the indications of the other rows, the lines on said chart having each of their opposite ends adjacent one of said indications, the panel covering said dials, and having openings for exposing said dials, the dials each having a single row of indications similar to a row of indications on the chart, the indications on the various dials including all said indications on said chart.

3. The combination of a panel having a chart on its upper face, said chart having rows of calibrated indications of electrical measuring units adjacent its edges, and intersecting lines each with opposite ends adjacent one of said indications, a slidable member on the under face of the panel, a shaft on said member, a dial on the shaft between the member and panel, additional dials on the lower face of the panel, a chain having its ends affixed to said member and connected to rotate said additional dials, the shaft extending through the panel to the upper face thereof, other additional dials on the under face of the panel, and chains connected to said shaft and said other additional dials to rotate the latter, all said additional dials being adjacent the corners of the chart, the panel having openings through which said dials are visible, said dials each carrying a single row of similar indication which collectively repeat all the indications on the chart.

4. The combination of a panel having a chart on its upper face, said chart having rows of calibrated indications of electrical measuring units adjacent its edges, and intersecting lines each with opposite ends adjacent one of said indications, a slidable member on the under face of the panel, a shaft on said member, a dial on the shaft between the member and panel, additional dials on the lower face of the panel, a chain having its ends affixed to said member and connected to rotate said additional dials, the shaft extending through the panel to the upper face thereof, other additional dials on the under face of the panel, and chains connected to said shaft and said other additional dials to rotate the latter, all said additional dials being adjacent the corners of the chart, the panel having openings through which said dials are visible, said dials each carrying a single row of similar indication which collectively repeat all the indications on the chart, said panel having another opening above the dial on said shaft.

5. The combination of a panel having a chart on its upper face, said chart having rows of calibrated indications of electrical measuring units adjacent its edges, and intersecting lines each with opposite ends adjacent one of said indications, a slidable member on the under face of the panel, a shaft on said member, a dial on the shaft between the member and panel, additional dials on the lower face of the panel, a chain having its ends affixed to said member and connected to rotate said additional dials, the shaft extending through the panel to the upper face thereof, other additional dials on the under face of the panel, and chains connected to said shaft and said other additional dials to rotate the latter, all said additional dials being adjacent the corners of the chart, the panel having openings through which said dials are visible, said dials each carrying a single row of similar indication which collectively repeat all the indications on the chart, said panel having means for engaging said dials to hold one or more thereof stationary while the others are rotated.

6. In a computing device, the combination of a panel, a slidable member carried by the panel, adjacent one of the ends of the panel, a rotatable shaft on said member, a pair of rotatable dials carried by said panel, an idle pulley adjacent said end, another idle pulley spaced from said end, a chain enagging said pulleys and connected to turn said dials, the ends of the chain being attached to said member, another pair of rotatable dials adjacent the opposite end of said panel, a third pair of rotatable dials between said member and said other pair, chains connected one to each of said other dials and to a diagonal one of the third pair of dials, a pair of idle pulleys carried by said panel at each side of said member, the pulleys of each pair of said idle pulleys being disposed adjacent the ends of said member, a rotatable dial on said shaft, a pair of gears on said shaft, and a chain engaging said idle pulleys and the gears on said shaft and running to said third pair of dials to operate said third pair of dials.

7. In a computing device, the combination of a panel, a slidable member carried by the panel, adjacent one of the ends of the panel, a rotatable shaft on said member, a pair of rotatable dials carried by said panel, an idle pulley adjacent said end, another idle pulley spaced from said end, a chain engaging said pulleys and connected to turn said dials, the ends of the chain being attached to said member, another pair of rotatable dials adjacent the opposite end of said panel, a third pair of rotatable dials between said member and said other pair, chains connected one to each of said other dials and to a diagonal one of the third pair of dials, a pair of idle pulleys carried by said panel at each side of said member, the pulleys of each pair of said idle pulleys being disposed adjacent the ends of said member, a rotatable dial on said shaft, a pair of gears on said shaft, and a chain engaging said idle pulleys and the gears on said shaft and running to said third pair of dials to operate said third pair of dials, said panel having a slot through said shaft projects, and an opening adjacent each of said dials.

References Cited in the file of this patent

UNITED STATES PATENTS

| 1,572,520 | Fagerholm | Feb. 9, 1926 |
| 2,116,508 | Colvin | May 10, 1938 |
| 2,247,531 | Thurston | July 1, 1941 |
| 2,369,420 | Thurston | Feb. 13, 1945 |
| 2,418,370 | Simmon | Apr. 1, 1947 |
| 2,767,909 | Morris | Oct. 23, 1956 |

FOREIGN PATENTS

| 183,724 | Switzerland | July 1, 1936 |